United States Patent [19]

Chrysler

[11] 3,936,878

[45] Feb. 3, 1976

[54] DISC INTERFACE LOCATION

[75] Inventor: Walter R. Chrysler, Pleasant Valley, N.Y.

[73] Assignee: International Business Machines Corporation, Armonk, N.Y.

[22] Filed: Dec. 26, 1973

[21] Appl. No.: 428,601

[52] U.S. Cl. .................. 360/98; 250/227; 250/570; 360/71; 360/72

[51] Int. Cl.$^2$ ........................G11B 17/22; G11B 5/016; G11B 25/04

[58] Field of Search ............. 360/99, 98, 69, 70, 72, 360/71; 340/146.3, 174.1 C; 250/227, 570

[56] References Cited

UNITED STATES PATENTS

| | | | |
|---|---|---|---|
| 2,994,072 | 7/1961 | Woody, Jr. | 360/72 |
| 3,130,393 | 4/1964 | Gutterman | 360/72 |
| 3,435,314 | 3/1969 | Bradley et al. | 360/71 |
| 3,509,553 | 4/1970 | Krijner | 360/72 |
| 3,539,716 | 11/1970 | Stratton et al. | 360/98 |
| 3,573,471 | 4/1971 | Kolb | 250/227 |
| 3,585,396 | 6/1971 | Ferguson | 250/570 |
| 3,820,884 | 6/1974 | Sone et al. | 250/570 |

*Primary Examiner*—Alfred H. Eddleman
*Attorney, Agent, or Firm*—Robert Lieber

[57] ABSTRACT

A disc storage file includes a multiplicity of closely spaced continuously rotating flexible or floppy discs associated with an accessing assembly for spreading the discs apart at randomly selected positions to accommodate a magnetic head. Apparatus for locating the disc interface (gap) to be accessed includes a pair of offset photocells which are light coupled to the disc gaps. The light applied to the photocells is guided in offset channels of a shroud and shaped congruent to the photocell surfaces by offset fiber optic shaping arrays. The offset arrays and associated electronics allow for accurate counting of gaps in the presence of fluctuating disc motion in the axial direction.

9 Claims, 8 Drawing Figures

END VIEW

DIRECTION SENSE LOGIC

DISC INTERFACE LOCATION

BACKGROUND OF THE INVENTION

1. Field of the Invention

The invention pertains to photoelectric apparatus for counting interface gaps between spaced storage discs in a rotary file of multiple flexible or floppy type magnetic discs in continuous motion; especially when the disc edges are subject to transient fluttering parallel to the axis of rotation.

2. Cross References to Related Applications

1. U.S. patent application Ser. No. 375,985 by R. O. Cobb et al, filed July 2, 1973 now U.S. Pat. No. 3,835,998.

2. U.S. patent application Ser. No. 414,614 by R. J. Penfold et al, filed Nov. 7, 1973, now U.S. Pat. No. 3,867,723.

3. Description of the Prior Art

The above cross-referenced Penfold et al application discloses a rotating magnetic disc storage file, including multiple flexible or floppy storage discs maintained in continuous high speed rotation, wherein successive discs are separated by relatively small diameter thin spacer discs. Typically the storage discs have nominal thickness of about 0.003 inch. Outward application of pressured air, through the longitudinally apertured spindle which supports the discs, causes the storage discs to be spaced uniformly at intervals of about 0.003 inch when rotating at typical speed of 1800 rpm.

Spaced disc files of this type represent improvement, in terms of design simplicity, operational stability and access time efficiency, over flexible disc files of the kind disclosed in U.S. Pat. Nos. 3,509,533 (Krijnen) and 3,618,055 (Van Acker). In turn the latter files represent ostensible evolutionary advancements over an earlier type of non-flexible (or semi-flexible) disc file disclosed in U.S. Pat. No. 3,130,393 (Gutterman). In the Gutterman patent relatively thicker slidably mounted magnetic discs rotate contiguously in a closed air-tight environment and are separated for access by application of high pressure air radially inward at a selected interface. This displaces a subset of the discs, in a piston-like operation, to form a space (gap) suitable for accommodating a magnetic head.

In files of stacked flexible discs it is usually desirable to locate the access position by sensing and counting operations. However such sensing and counting must not be subject to error when there is fluttering of the discs or run-out variations in disc thickness which could cause double sensing (false counting) of a gap.

The Gutterman patent specifically suggests cumulative electronic counting of disc edges sensed by electromechanical (piezoelectric) means and inplies alternative use of magnetic or optical edge sensing.

The above cross-referenced patent application by R. O. Cobb et al addresses problems incidental to tracking axial components of flexible disc motion by parallel optical sensing. It discloses a stationary array of integrated circuit photodetectors which is light coupled in parallel to all of the discs. Individual photodetectors of the array have width dimensions an order of magnitude smaller than the nominal disc thickness so that several detector elements are light coupled to each disc. By sensing the distribution of light across the detector elements the position of the access apparatus relative to the discs is instantaneously distinguishable for parallel sampling and electronic counting. With large numbers of discs this arrangement can be quite costly, at the present state of development of integrated circuit technology, and dissipates more power than the serial sensing arrangement suggested by Gutterman which would use a single sensor coupled to only one disc interface at a time.

However, in sensing the discs one at a time by optical coupling, light must either be confined to one disc edge and sensed upon reflection or confined to one interface space (gap) and sensed after transmission. Realization of this under fast access conditions with a high degree of reliability is not simple to achieve. For reflective coupling optimal results are realized only if the disc edges are processed to a smooth reflective finish (e.g., by lathe trimming, polishing, painting, etc.) and this naturally increases system fabrication and maintenance costs. On the other hand transmissive coupling through inter-disc spaces presents difficulties due to the narrow width (about .003 inch and long length of the coupling path (several inches in a file of 12 inch diameter discs). Light attenuation due to dispersion and scattering (e.g., from dust, debris on the disc surfaces, and/or edge slivers on the discs) weakens the coupling and thereby increases the possibility of erroneous readings. Upon error the access assembly must be repositioned degrading access time performance.

With either type of coupling (reflective or transmissive) transient light-to-dark transitions due to transitory components of disc edge motion (due to fluttering and/or variations in disc shape or thickness) can be quite difficult to track and accurately count.

Transmissive coupling losses can be reduced by use of coherent (i.e., laser) light but the increased cost may be unattractive. Another obvious alternative, increasing the intensity of non-coherent source light, presents the risk of subjecting the recording surfaces of the discs to possible damage or warping stress due to the accompanying heat.

SUMMARY OF THE INVENTION

An object of the present invention is to provide economical, safe, rapidly responsive and reliable sensing apparatus for accurately counting and tracking gaps between discs in files of spaced flexible discs of the kind disclosed in the above cross-referenced Penfold et al application.

Another object is to provide counting and tracking apparatus, for controlling rapid access to densely configured flexible discs rotating cylindrically at high speeds, based upon sensing of safe intensity levels of non-coherent light coupled through spaces between the discs.

Another object is to provide safe, accurate, efficient, reliable and economical disc gap sensing apparatus for serially counting disc gaps in a cylindrically rotating file of spaced flexible discs subject to transient axial motion.

A feature of the invention is the employment of specifically arranged offset light guiding and shaping elements for coupling light efficiently from narrow gap spaces between rotating flexible discs to a relatively "wide" surface.

Another feature of the invention is the employment of a pair of slightly offset sensing assemblies, each assembly comprising a light confining shroud and fiber optic shaping array in congruent association with respective photocells and tracking logic circuitry for providing accurate counting and tracking of disc gaps in a rotary disc file of spaced flexible discs. A necessary condition is that the assembly offset is less than the nominal gap width (a sufficient condition is that the offset be less than half the nominal gap width).

A feature of the tracking and counting logic is the ability to avoid posting of false counts due to transitory axial motion of the disc edges.

The foregoing and other objects, features and advantages of this invention will be more fully appreciated upon consideration of the following detailed description and claims.

DETAILED DESCRIPTION OF PREFERRED EMBODIMENT

Figure 1:
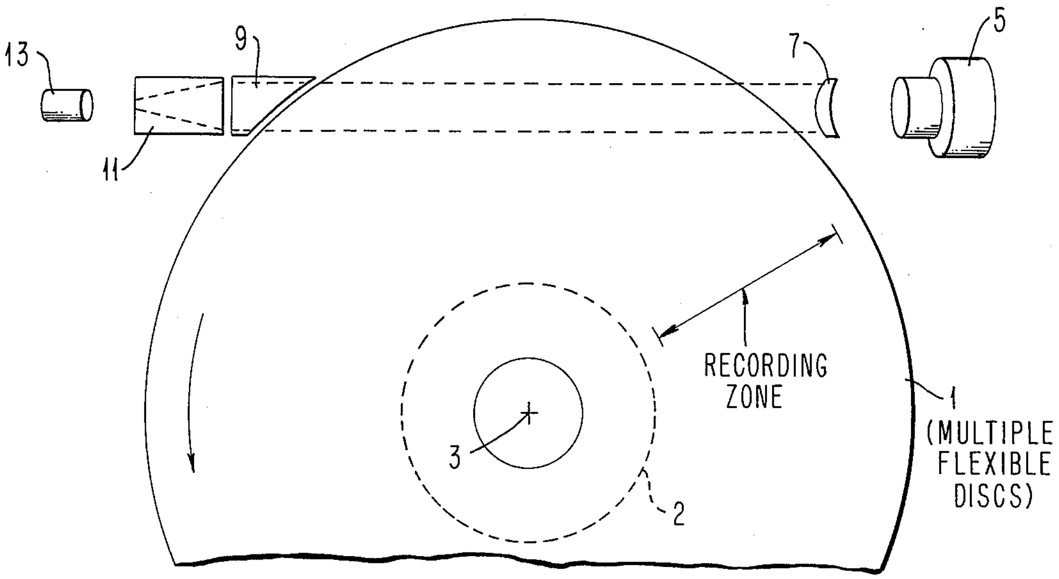
FIG. 1 is a schematic end view of a dynamically rotating cylindrical disc file of flexible discs, and basic sensing apparatus for sensing spaces (gaps) between the discs.

Referring to FIG. 1 a multiple disc file assembly of the type described in the above cross-referenced Penfold et al application includes a plurality of spaced flexible discs 1 and inter-disc flexible spacers 2 continually revolving about axis 3. Sensing apparatus in accordance with the present invention includes light source 5, collimating lens 7, apertured shroud 9, light shaping fiber optic unit 11 and light sensor 13. The sensing apparatus is mounted upon a not shown carriage for movement parallel to the rotational axis 3 of the disc assembly so that the light source 5, 7 and sensing assembly 9–13 become alternately coupled and decoupled through the spaces (gaps) between the discs as the sensing apparatus moves relative to the discs; whereby electrical variations produced in the sensor 13 may be cumulatively counted.

Not shown access apparatus (including a magnetic head), located beneath and in line with the shroud 9, is transported together with the sensing assembly 9–13; whereby the access apparatus can enter and displace the discs at randomly preselected gaps when the cumulative count corresponds to a selected address and thereby provide recording/reproduction access to the disc surfaces.

In a typical environment the discs would have nominal thickness of about 0.0017 inch and nominal separation spacing of approximately 0.003 inch. In this environment shroud 9 provides a slotted light coupling passageway, of rectangular cross-section, about ¼ inch long by 0.003 inch wide. The light receiving end of the shroud is made to conform closely to the disc edges along the path of disc rotation.

Light shaping unit 11 preferably consists of an array of light conducting fibers (nominal fiber thickness 0.003 inch) arranged in a line-to-spot shaping configuration. The lineshaped light receiving end of the fiber array is aligned with and substantially congruent in shape to the light emitting end of the shroud. The spot-shaped light emitting end of the fiber array is aligned with and shaped substantially congruent to the sensitive light receiving surface of sensor 13. Sensor 13 has a circularly shaped sensing surface approximately 0.03 inch in diameter (approximately ten times the width of the disc aperture). The area of the sensing surface (about 0.0007 square inch) is approximately equal to the area of the shroud aperture at the fiber interface.

Shaped fiber arrays of this type are formed from planar sheets of optical fibers bound by an adhesive. In wellknown fashion the sheet is cut to required dimensions, the adhesive is removed from the end which is to be shaped to spot form and the separated fibers are rearranged and readhered in spot formation.

In the preferred embodiment next described with reference to FIGS. 3–8 a dual offset configuration of the light receiving parts of the above-described basic sensing apparatus is utilized. The shroud comprises two separate ¼ inch by 0.003 inch light guiding passages 9*a* and 9*b* preferably lined with light reflective material and may be formed in sections with the passages milled as groves in the sections. The milled passages are parallel but relatively offset from each other by a displacement d (FIG. 4) which is less than the width of a disc gap (suitably $d = 0.0010$ inch for discs nominally 0.0017 inch thick). Interfacing congruently with the shroud exit apertures are relatively offset linearly configured ends of respective fiber optic shaping arrays 11*a* and 11*b* (each ¼ inch by 0.003 inch). Arrays 11*a* and 11*b* have "spot" configured output ends interfacing congruently with respective photodetectors 13*a* and 13*b*.

The shroud/fiber array assembly is secured to housing 15 (FIG. 3) by not shown screws. Light source 5 (FIG. 3) is also secured to the housing. The housing is mounted upon a not shown carriage for movement parallel to the axis of rotation of the discs.

The photo reflectors 13 may conveniently be Texas Instruments Co. type LS 654 light sensors. Light source 5 may be a Welch Allyn Incadescent Lamp (5V, 4w) type No. 999079-48, collimated by a simple plano convex lens.

Figure 5:
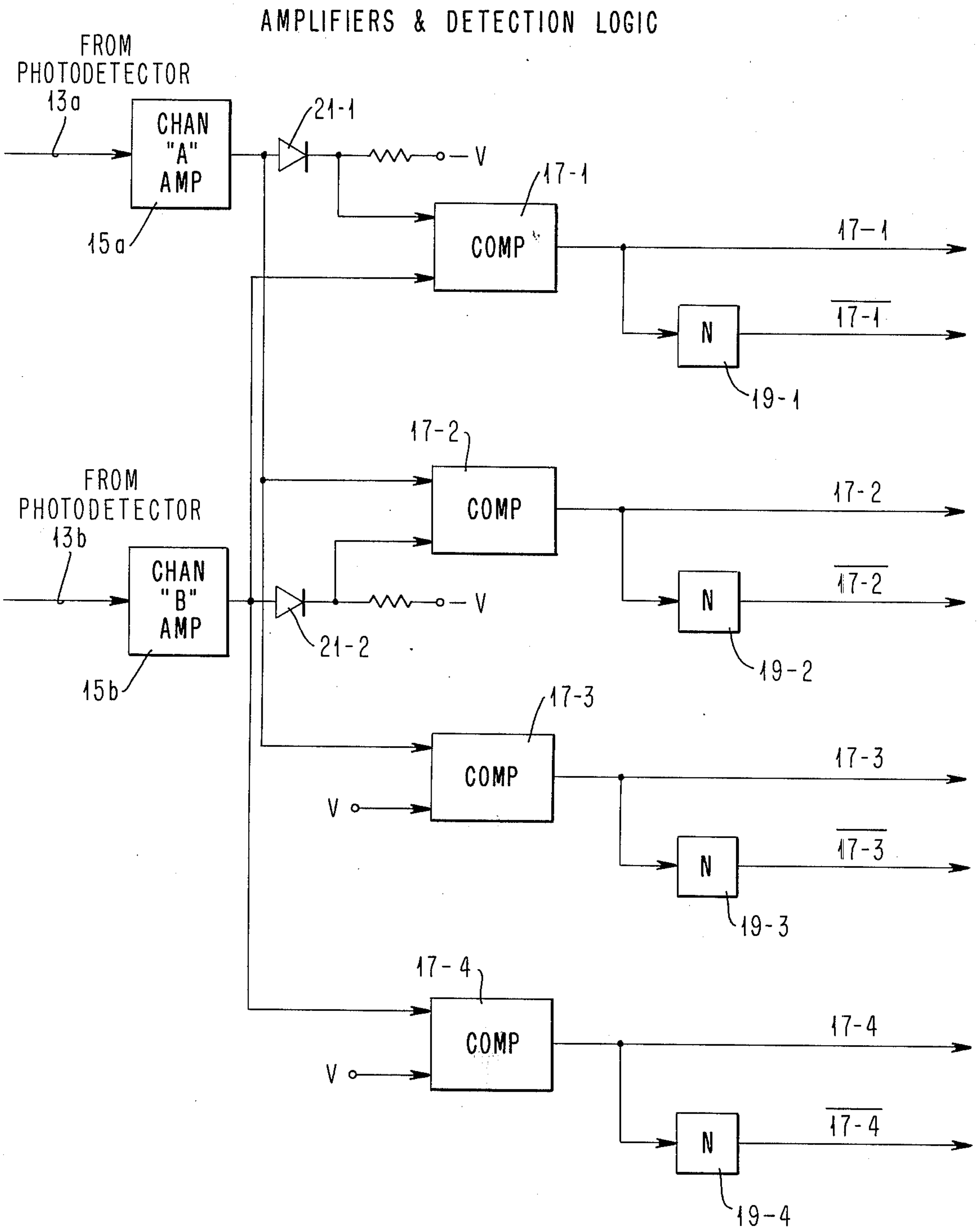
FIGS. 5–7 are schematics of counting and tracking logic circuits coupling to the photocells of FIG. 3.

Referring to FIGS. 5–8, outputs of photodetectors 13*a* and 13*b* are channelled through respective amplifiers 15*a* and 15*b*, to differential comparator circuits 17-1, 17-2, 17-3 and 17-4 (FIG. 5). Amplifiers 15*a* and 15*b* are 30-db non-inverting operational amplifiers with pre and post voltage follower stages. Each amplifier stage and follower stage may be an RCA type CA30-30A integrated circuit amplifier. Each of the comparators 17 is a standard differential voltage comparator circuit; for instance, Texas Instrument SN 72810.

Figure 8:
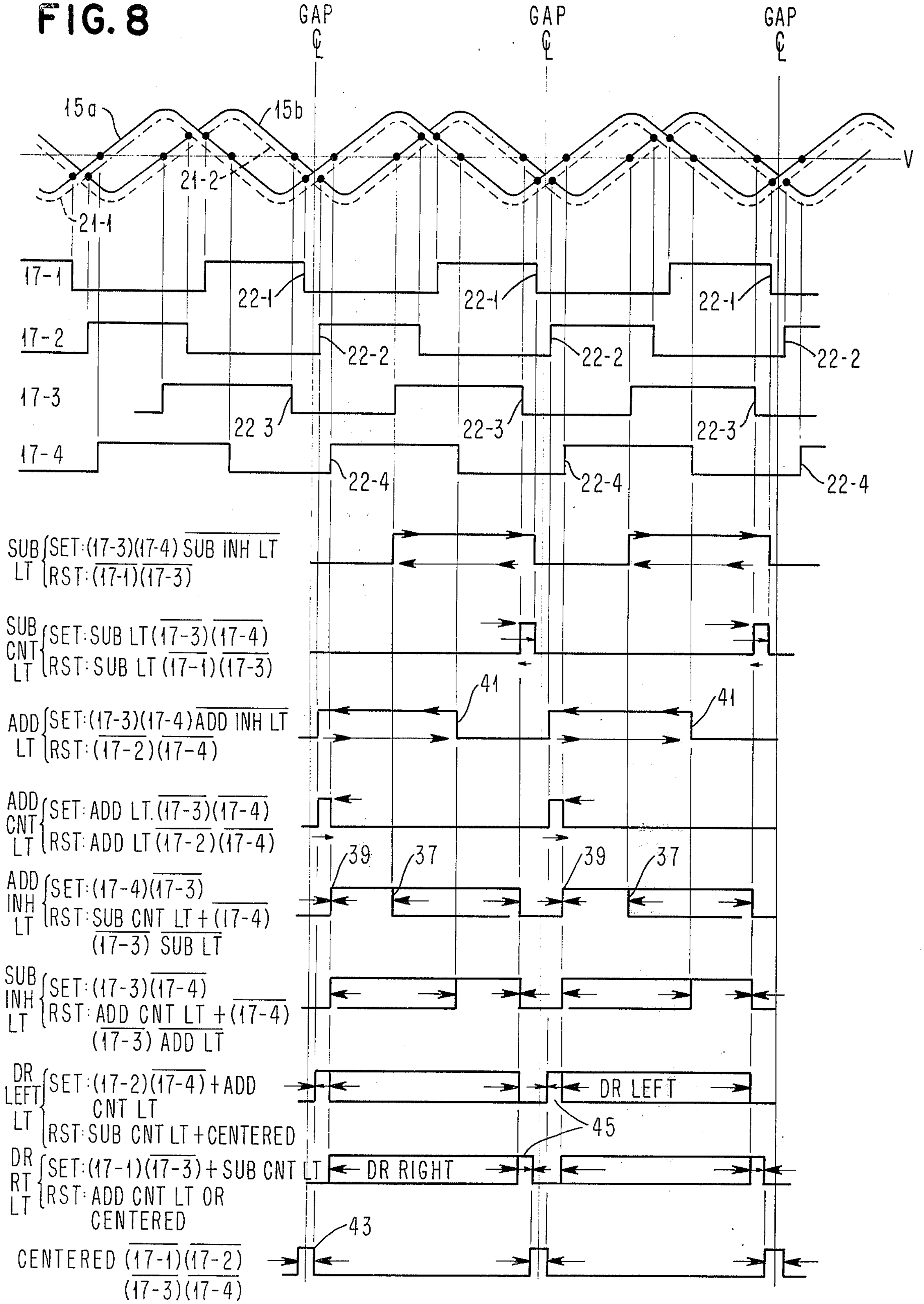
FIG. 8 is a signal waveform diagram for explaining operation of the counting and tracking circuits of FIGS. 5–7.

Outputs of comparators 17 are inverted by respectively numbered inverters 19-1, 19-2, 19-3 and 19-4. The comparator outputs are designated by the respective comparator numbers (17-1, 17-2, 17-3, 17-4) and the inverter outputs are designated by the respective comparator number overscored ($\overline{17\text{-}1}$, $\overline{17\text{-}2}$, $\overline{17\text{-}3}$, $\overline{17\text{-}4}$). Comparator 17-1 compares outputs of amplifier 15*b* with the offset output of amplifier 15*a* attenuated by the small forward voltage drop across diode 21-1. Similarly, comparator 17-2 compares output of amplifier 15*a* with offset output of amplifier 15*b* attenuated by forward voltage drop across diode 21-2. Characteristics of diodes 21-1 and 21-2 are chosen to provide transitional comparator outputs when outputs of amplifiers 15*a* and 15*b* are slightly offset from one another and are passing through a "centered" transitional phase corresponding to centered positioning of apertures 9*a*, 9*b* slightly left and right of a disc gap center line. The circuit parameters are chosen so that the output of 17-1 is at a low or negative level when the center of apertures 9*a* and 9*b* is to the right of a fine left limit position just left of the center line of the disc gap coinciding with the rise of 17-1 after the gap center line at 22-1 (FIG. 8). This threshold position is a fraction of a millimeter (i.e., a fraction of a gap width) to the left of the gap center due to the relatively small voltage drop across the diode. Similarly, circuit parameters associated with comparator 17-2 and diode 21-2 are designed so that the output of 17-2 is negative or low when the center of apertures 9*a*, 9*b* is to the left of a fine limit position just to the right of the gap center line (by a fraction of the gap width) coinciding with the rise of 17-2 at 22-2 (FIG. 8).

Comparators 17-3 and 17-4 are referenced to voltage V to provide for respective comparator outputs to be low or negative so long as the center of apertures 9*a*, 9*b* is respectively to the right and left of respective left and right coarse limit positions (FIG. 8) relative to a gap center line. Thus, comparators 17-1 and 17-2 provide outputs capable of indicating that the aperture center is aligned with the center line of a facing disc gap within limits of a fine or narrow range and comparators 17-3 and 17-4 provide outputs indicating that the aperture center is aligned with the center of a facing disc gap within limits or a coarse or wide range. By virtue of the aperture offset these comparators provide sequential transitions, indicative of the direction of movement of the apertures relative to the above-mentioned threshold limits, which are useful to prevent false counting of disc gaps when the disc edges are fluttering in a random manner.

Figure 6:
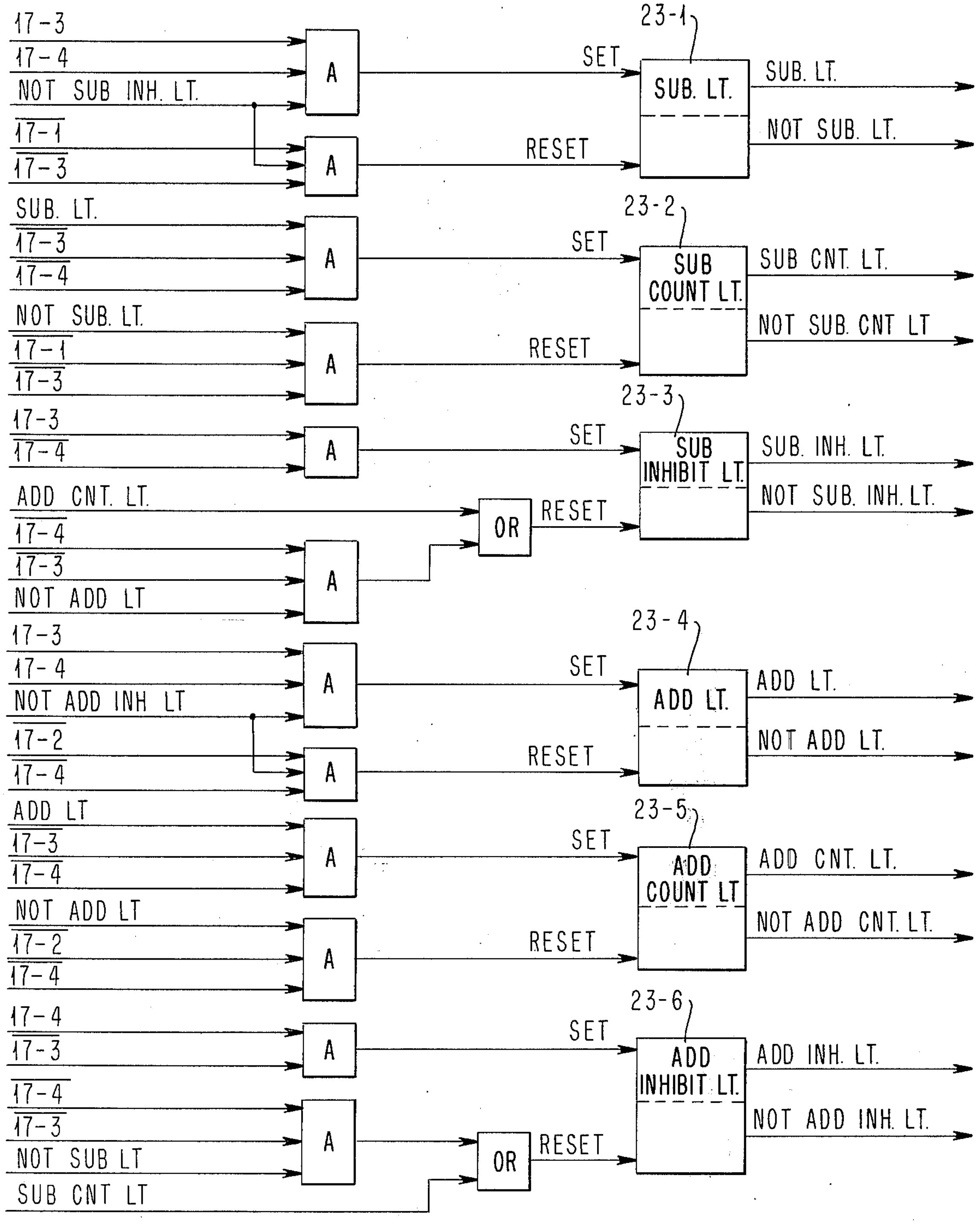
Figure 7:
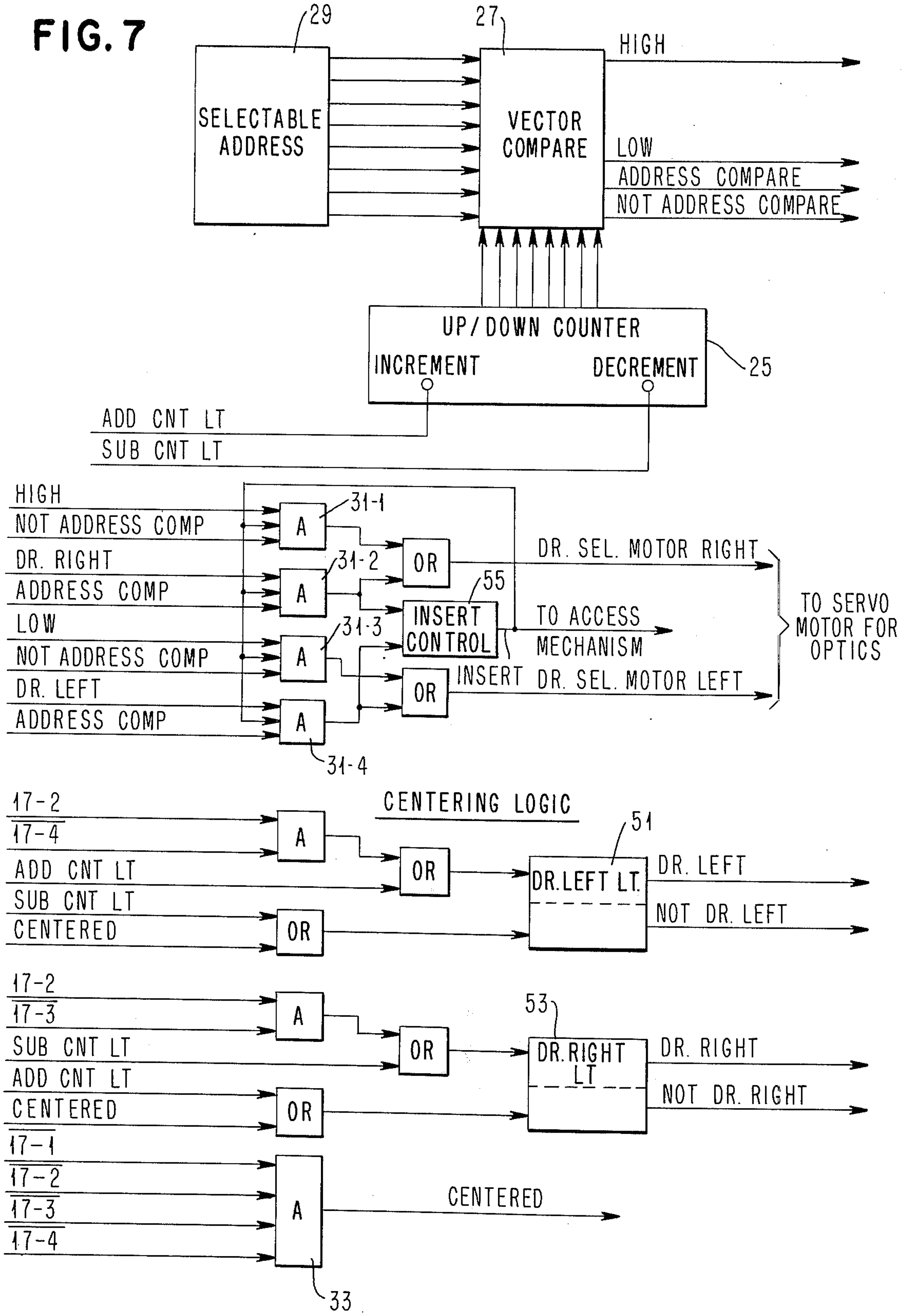

Outputs of comparators 17-1 through 17-4 control AND circuits (A) of FIG. 6 which condition latches 23-1, 23-2, 23-3, 23-4, 23-5, 23-6 (FIG. 6) under conditions determined by the instantaneous output conditions of these comparators and latches. Outputs of comparators 17-1 through 17-4 are also applied in combination with outputs of latches 23-1 through 23-6 to centering logic (FIG. 7). The centering logic operates to provide drive right and drive left control signal functions for servoing the aperture system 9-11 (FIG. 3) to the narrow centering range of a selected disc gap under conditions described below.

Figure 2:
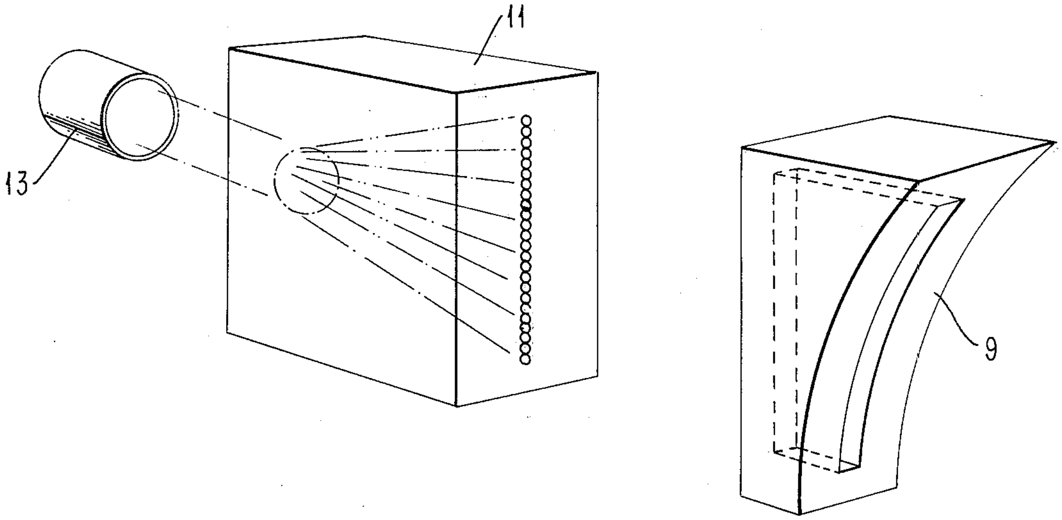
FIG. 2 is a schematic providing perspective views of the shroud, optical fiber array and photodetector elements of the basic sensing apparatus disclosed in FIG. 1.
Figure 3:
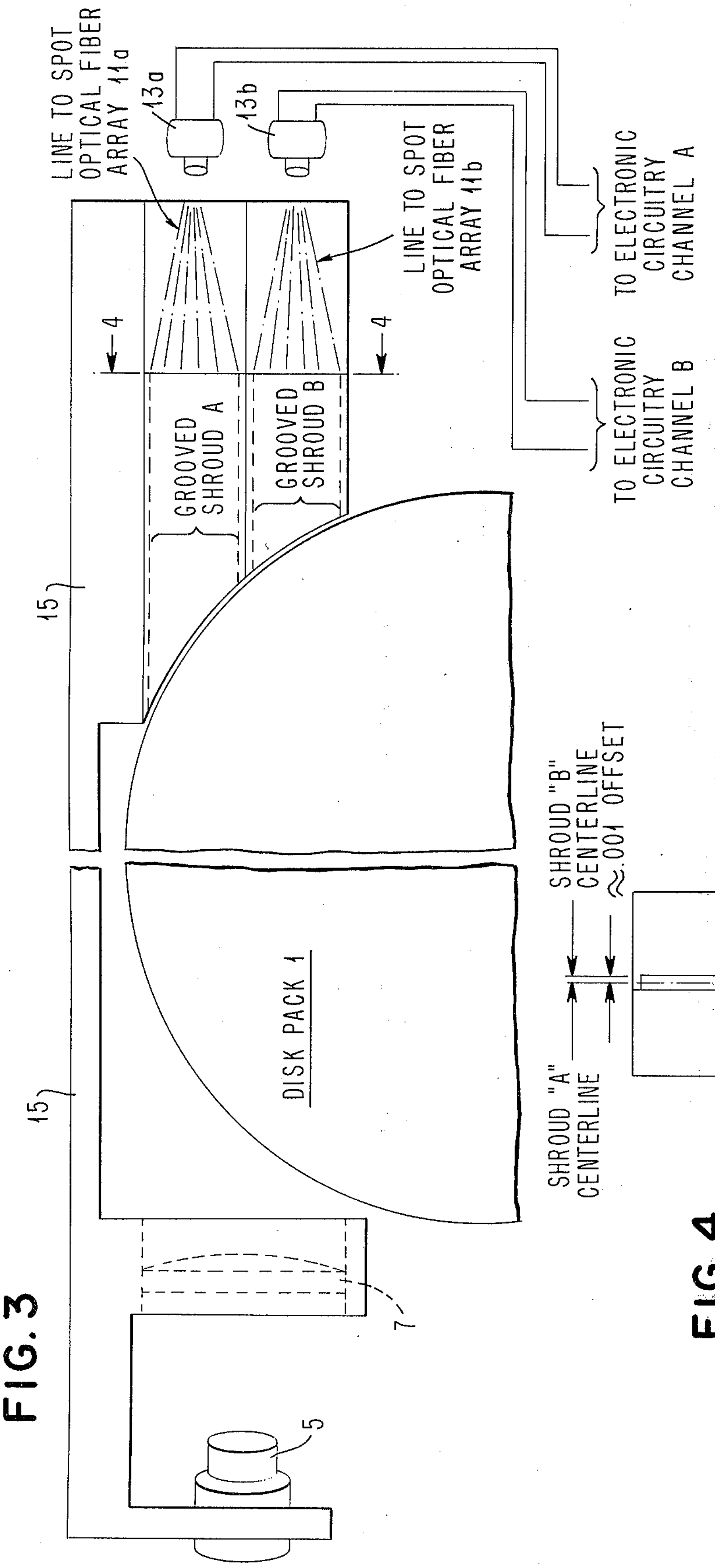
FIG. 3 is a side elevational view of a dual sensing configuration in accordance with the invention.
Figure 4:
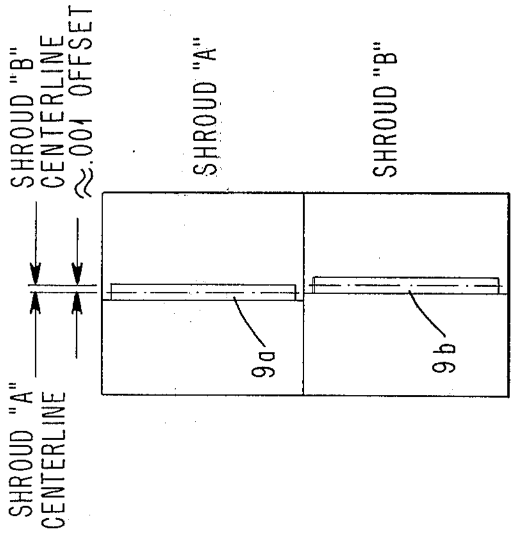
FIG. 4 is a sectional view along lines 4—4 in FIG. 3.

Outputs of count latches 23-2 and 23-5 are applied respectively to decrement and increment inputs of forward-backward counter 25. Outputs of counter 25 are compared by vector comparator circuit 27 to contents of an address register 29. Comparator 27 provides output indication of equality (Address Compare) or inquality (Not Address Compare) between the compared address and count arguments. With the inequality indication comparator 27 provides high or low output indication indicating that the address argument is greater or less than the count argument. The high-low indications are used for servoing the sensing system 9-13 (FIGS. 1–3) towards the gap corresponding to the address set into register 29.

Comparator 27 is of the type described, for instance, in "The Logic Design of Transistor Digital Computers", by G. A. Maling and J. Earle, Prentiss Hall, 1963, pages 262-264.

The general operation of the circuitry just described is as follows. When vector compare circuit 27 detects inequality between the compared address and count arguments it provides high or low output indication to respective AND circuit 31-1 or 31-3 (FIG. 7) to provide right or left drive impetus to the not-shown servo motor which positions the sensing assembly 9-11. This drives the assembly 9-11 in a direction tending to reduce the difference between the compared address and count arguments until equality is detected by vector compare circuit 27. At equality (Address Compare) AND circuits 31-2 and 31-4 are conditioned to pass right and left drive impetus to the above-mentioned servo motor which drives the sensing assembly in a direction tending to maintain centering of the sensing apparatus within the narrow range limits to either side of the center of the selected disc gap.

Additional details of operation of the foregoing circuits are now described with reference to FIGS. 3–8. Assume that the disc gaps are numbered in descending order, in a direction into the page in the view of FIG. 3, so that the furthest gap would have address number 1, the next furthest number 2, etc. Assume also that the count in counter 25 is normally progressively incremented for left movement of the sensing assembly relative to the disc gaps (up in FIG. 3) and decremented for right movement relative to the disc gaps (down in FIG. 3).

Disregarding transitory motion of the disc edges left relative movement of aperture 9*a*, 9*b* causes Add Inhibit Latch 23-6 and Subtract Inhibit Latch 23-3 to be set and reset in specific phase sequence so as not to interface with setting of Add Latch 23-4 while inhibiting setting of Subtract Latch 23-1 (refer to positions 37, 39, 41 FIG. 8). In turn this allows Add Count Latch 23-5 to be set in coincidence with action 22-4 (FIG. 8) just as the right limit of coarse centering range is passed while it blocks earlier setting of the Subtract Count Latch 23-2. Setting of Add Count Latch results in incrementing of counter 25 (FIG. 7). Add Latch and Add Count Latch are coincidentally reset just as the aperture center passes into fine centering range coincident with the rise of centered position 43 (FIG. 8). Thus if there were no relative disc edge motion the count would be monotonically increased until it matched the selected address (Address Compare).

Disregarding transistory disc motion right movement of the aperture center relative to the disc gaps causes counter 25 to be progressively decremented. Subtract Inhibht Latch 23-3 is set before the aperture center reaches the left limit of the coarse centering range and reset just as this limit is passed. Reset state of Subtract Inhibit Latch allows Subtract Latch 23-1 to be set before the left coarse limit is reached, which in turn allows Subtract Count Latch 23-2 to be set just as the left coarse limit is reached. Setting of Subtract Count Latch decrements counter 25. Subtract Latch and Subtract Count Latch are reset in coincidence with the left rise of "centered" at the left limit of "fine" centering. Thus the counter is progressively decremented as the aperture moves to the right relative to the disc gaps.

Upon reversal of apparent aperture motion due to transitory axial motion of the disc edges (due for instance to fluttering, thickness run-out, etc.) the effect on the accumulated count in counter 25 will depend upon the aperture position at the instant of reversal. If the aperture is actually moving to the left and ostensibly reverses movement due to a left shift of the disc edges the increment controls will not be affected if the reversal occurs while the Add Inhibit Latch is set (i.e. before a count increment is posted) and the decrement control logic will be prepared as for a straightforward decrement operation. If reversal occurs after setting of Add Count Latch (i.e. after posting of a count increment) Add Count Latch is reset either at position 41 or at the right limit of fine centering and the control logic (i.e. the inhibit latches) and conditioned to allow decrementing operation while inhibiting incrementing. A decrement is then posted only if the aperture center passes into the centering range of the next gap to the right of the gap for which count increment has just been posted. Upon a second reversal of the apparent motion to the original left direction, after posting of the count increment but before a decrement has been tallied, the Inhibit logic remains conditioned to prevent setting of Add Count Latch and thereby prevent posting of a false count increment when the aperture center passes the center of the previously counted gap. By similar considerations it may be verified that under all conditions only one net count is tallied per gap regardless of the transient motion of the disc edges.

At Address Compare the centering logic associated with latches 51 and 53 (FIG. 7) in cooperation with AND's 31-2 and 31-4 (FIG. 7) supplies left and right drive impetus to servo the aperture center to the center of the selected gap. As the aperture center initially enters coarse centering range of the selected gap from the right or left Subtract Count Latch or Add Count Latch is respectively set. In addition to giving rise to the final count decrement or increment producing the Address Compare indication, this enables the respective latch 53 or 51 to be set and thereby supply sufficient impetus to carry the aperture center through the center line of the selected gap. Thereafter, as the aperture center passes out of fine centered range, either to the left or right of the selected gap, the appropriate latch 53 or 51 is set to provide reverse right or left drive stimulus to the servo motor returning the aperture center to the centered position (note positions 45, FIG. 8).

Logic 55 (FIG. 7) receives outputs of AND's 31-2 and 31-4 of FIG. 7 representing centering of the sensing apparatus at the selected gap and produces an Insert signal which is used to disable AND'S 31-1 through 31-4 and to control movement of not-shown access apparatus into the selected gap. This separates the rotating discs at the gap, in order to make room for operation of a transducing head relative to the disc surfaces facing the gap. Disabling of AND's 31-1 through 31-4 blocks drive impetus to the sense assembly servo motor preventing sense assembly movement until access apparatus has been removed from the gap. Upon removal of the access apparatus from the gap the Insert signal is removed, re-enabling AND circuits 31-1 through 31-4 to re-supply drive stimulus to the sense assembly servo motor. A new address may be set into register 29 (FIG. 7) at any time after rise of the Insert command since the servo drive controls 31-1 through 31-4 are then effectively disabled.

If the disc edges are consistently fairly stable Insert controls 55 may be made simply responsive to OR'd outputs of AND's 31-2 and 31-4 for setting a latch which provides the Insert and $\overline{\text{Insert}}$ conditions and that latch may be reset when the access operation is terminated by removal of the access assembly. On the other hand, if there is extensive instability in the system or if the discs are tightly spaced, or if the reaction time of the access apparatus is limited, the OR'd output of AND's 31-2 and 31-4 may be subjected to filtering in order to determine a sufficiently stable condition for guaranteeing accurate placement of the access apparatus into the correct disc gap.

While the invention has been particularly shown and described with reference to a preferred embodiment thereof, it will be understood by those skilled in the art that the foregoing and other changes in form and detail may be made therein without departing from the spirit and scope of the invention.

What is claimed is:

1. In a rotating disc storage file comprising multiple spaced flexible discs and access position sensing apparatus movable relative to edges of said discs for detecting spaces between said discs and for providing signals which can be used to accurately count said spaces, improved sensing apparatus comprising:

a source of light for illuminating said spaces;

a pair of photocells; and a pair of offset fiber optic shaping arrays movably positioned between said discs and said photocells for conveying light from said spaces to respective said photocells in a form congruent to the shape of said photocells; said arrays having line-shaped light receiving ends arranged in parallel lines offset from each other in the direction of the axis of rotation of the discs by an offset spacing distance less than the width of a disc space.

2. Sensing apparatus according to claim 1 including:

logic circuit means responsive to signals developed by said photocells for developing count increment and count decrement signal functions capable of being used to accurately count said disc spaces even when edges of said discs are in transitory motion relative to said fiber optic arrays.

3. Sensing apparatus in accordance with claim 2 wherein said logic circuit means includes:

plural voltage comparator circuits coupled to said photocells for developing signals useful to indicate the instantaneous direction of movement of said light receiving ends of said fiber array relative to said disc spaces and the displacement of the center of said light receiving ends relative to the closest said disc space; and logic circuits coupled to said comparator circuits for utilizing said directional and displacement signals to develop said count increment and count decrement signals; said signals being useful to control accurate counting of said spaces when the disc edges are in transitory motion relative to said light receiving ends of said fiber array.

4. In a rotating disc storage file having multiple coaxially mounted flexible discs in an ordered axial sequence, sensing apparatus movable relative to said discs for detecting accessible storage spaces between said discs and bidirectional counting circuitry for providing cumulative electrical count indications corresponding to the instantaneous position of said sensing apparatus relative to said disc spaces, improved counting apparatus comprising:

first logic circuit means for utilizing signals provided by said sensing apparatus to provide directional signal indications representative of the instantaneous direction of movement of said sensing apparatus relative to said discs;

a cumulatively conditionable bidirectional counter; and second logic circuit means coupled between said first logic circuit means and said counter for utilizing said directional signals to develop increment and decrement inputs to said counter having one-to-one correspondence to the said disc spaces traversed by said sensing apparatus with allowance for transitory motion of said disc edges relative to said sensing apparatus.

5. In combination with a rotating storage file, of floppy type storage disks separated by smaller diameter spacer disks which form ring-shaped open spaces between successive storage disks insufficient for transducing access --wherein said disks have transitory components of motion relative to said spaces and are required to be separated at a selected said space for transducing acess-- space locating apparatus comprising:

means for emitting radiant energy into said open spaces;

and apparatus electrically responsive to said energy separated from said means by said file and movable relative to edges of said disks and spaces in order to alternately receive and not receive radiant energy from said emitting means depending respectively upon whether a space or disk intervenes between said means and said apparatus; said apparatus including:

a radiant energy transducing element having a surface shape incongruent to the cross-sectional shape of a single said space; and a radiant energy guide structure for congruence matching, positioned between said file and said element and having first and second ends respectively adjacent said element and the periphery of said file; said first end being shaped congruent to the shape of said element and said second end being shaped congruent to said cross-sectional shape of a single said space.

6. Space locating apparatus in accordance with claim 5 wherein:

said radiant energy is light energy;

said transducing element is a photodetector having a generally circular shaped sensing surface considerably wider in diameter than the width of a space to be sensed; and said guide structure includes a fiberoptic array shaped congruent to the shape of said photocell at said first end and shaped in a linear array, congruent to the cross-sectional shape of a single said space at said second end.

7. Space locating apparatus in accordance with claim 6 including a shroud member positioned between said discs and said fiber optic array; said shroud member having an enclosed light confining passageway for congruently coupling light from an adjacent one of said disc spaces to said line-shaped end of said fiber array with minimal loss of light due to the curvature of the discs and minimal increment of stray light from sources other than said one disc space.

8. Space locating apparatus in accordance with claim 7, wherein said shroud comprises an arcuately shaped light receiving end conforming closely to the path of revolution of the discs for coupling light from said one space between said discs and minimizing escape of light from said one space to the space external to said shroud passageway.

9. Space locating apparatus in accordance with claim 8, wherein said shroud and at least the line-shaped end of said fiber optic array are mounted for movement as a unit parallel to the axis of rotation of said discs.

* * * * *